US008083957B2

(12) United States Patent
Innan

(10) Patent No.: US 8,083,957 B2
(45) Date of Patent: Dec. 27, 2011

(54) DECORATIVE MATERIAL, METHOD FOR PRODUCING DECORATIVE MATERIAL, AND MOLDED ARTICLE

(75) Inventor: Susumu Innan, Yokkaichi (JP)

(73) Assignee: Nissha Printing Co., Ltd., Kyoto-shi, Kyoto (JP)

(*) Notice: Subject to any disclaimer, the term of this patent is extended or adjusted under 35 U.S.C. 154(b) by 0 days.

(21) Appl. No.: 13/119,878

(22) PCT Filed: Sep. 28, 2009

(86) PCT No.: PCT/JP2009/004914

§ 371 (c)(1), (2), (4) Date: Mar. 18, 2011

(87) PCT Pub. No.: WO2010/038404

PCT Pub. Date: Apr. 8, 2010

(65) Prior Publication Data

US 2011/0168668 A1 Jul. 14, 2011

(30) Foreign Application Priority Data

Sep. 30, 2008 (JP) ................................ 2008-252207

(51) Int. Cl.
*B44C 1/22* (2006.01)
*C03C 15/00* (2006.01)

(52) U.S. Cl. ............................... 216/32; 216/40; 216/41

(58) Field of Classification Search ..................... 216/32
See application file for complete search history.

(56) References Cited

U.S. PATENT DOCUMENTS

| | | | | |
|---|---|---|---|---|
| 6,891,134 | B2 * | 5/2005 | Mandal | 219/465.1 |
| 2004/0042344 | A1 * | 3/2004 | Motokawa et al. | 368/47 |
| 2009/0042642 | A1 * | 2/2009 | Nissen | 463/25 |

FOREIGN PATENT DOCUMENTS

| | | | |
|---|---|---|---|
| JP | 60-168689 | A | 9/1985 |
| JP | 8-324196 | A | 12/1996 |
| JP | 2000-015992 | A | 1/2000 |
| JP | 2007-160918 | A | 6/2007 |

OTHER PUBLICATIONS

International Search Report of PCT/JP2009/004914, date of mailing Dec. 8, 2009.

* cited by examiner

*Primary Examiner* — Binh X Tran
*Assistant Examiner* — Thomas Pham
(74) *Attorney, Agent, or Firm* — Westerman, Hattori, Daniels & Adrian, LLP

(57) ABSTRACT

Disclosed is a decorative material in which a metal layer (e.g., a radio-wave-transmitting metal layer) on a non-metallic-lustrous part can be removed readily and sufficiently even when the metal layer is formed partially by a process involving an etching treatment, and can decorate a molded article with a desired pattern readily and satisfactorily. Also disclosed is a method for producing the decorative material. Further disclosed is a molded article produced by using the decorative material. Specifically disclosed is a decorative material (1) which mainly comprises: a support (2) having a first main surface (S1) and a second main surface (S2) both of which are opposed to each other; a metal oxide layer (12) which is arranged on the first main surface of the support (2) and comprises aluminum oxide; a radio-wave-transmitting metal layer (14) which is arranged on the metal oxide layer (12) and contains at least one member selected from the group consisting of Sn and In as a constituent component; a mask layer (16) which is arranged on the radio-wave-transmitting metal layer (14) and comprises a synthetic resin; and an adhesive layer (20) which is arranged on the mask layer (16) and comprises a synthetic resin. In the decorative material (1), the mask layer (16), the radio-wave-transmitting metal layer (14) and the metal oxide layer (12) are so laminated that all of these layers have almost the same pattern when observed in an almost normal direction of the main surface of the support (2).

3 Claims, 3 Drawing Sheets

DECORATIVE MATERIAL, METHOD FOR PRODUCING DECORATIVE MATERIAL, AND MOLDED ARTICLE

TECHNICAL FIELD

The present invention relates to a radio wave permeable decorative material having metallic luster for the purpose of using for decoration of a molded body.

BACKGROUND ART

Conventionally, a technology to decorate (carve decorative patterns on) a molded body, such as a case used for home electric appliances, for example, mobile phones and personal computers, with a film decorative material expressing characters and/or drawing patterns, has been actively used.

As this decorative material, for example, a decorative material disclosed in Patent Literature 1 ("transfer material" in the patent literature) is known, and as the configuration, one where a transfer layer expressing characters and/or drawing patterns is arranged to be peelable from a support substrate ("substrate sheet" in Patent Literature 1) on the support substrate is known (for example, see Patent Literature 1 and FIG. 2). A molded body can be decorated by attaching this transfer layer to the molded body and by peeling the support substrate.

The transfer layer is composed of a plurality of layers, and a configuration containing a synthetic resin and pigments and containing a pattern layer(s) expressing characters and/or drawing patterns is known (for example, see Paragraph [0020] of Patent Literature 1; "drawing pattern" may be expressed as "printed layer" in Patent Literature 1). Further, in order to add metallic luster to the characters and/or drawing patterns drawn on the pattern layer to the transfer layer, a configuration where a film-like metallic layer (metallic thin film layer) is partially established within the transfer layer is also known, and in addition, as the drawing pattern layer expressing the characters and/or drawing patterns, the configuration composed with a film-like metallic layer is known (for example, see Paragraph [0021] of Patent Literature 1).

As the metallic layer, a configuration of the decorative material adopting a metallic layer having radio wave permeability (hereafter, referred to as "radio wave permeable metallic layer") is known, and for example, a transfer material (decorative material) having an island structure of metallic deposited layer (radio wave permeable metallic layer) is disclosed in Patent Literature 2 as a decorative material having a radio wave permeable metallic layer.

Then, when the decorative material having a configuration partially containing the metallic layer, such as a radio wave permeable metallic layer, within the transfer layer is manufactured, as a method for forming the metallic layer, such as the radio wave permeable metallic layer, a method via a so-called etching process and another method via a so-called water washing process are known.

For example, as the method via the etching process, mainly, a method containing (1) a process to form a metallic layer over an entire principal surface of the underlayer; (2) a process to form a mask layer (referred to as "resist layer" in Paten Literature 1) on/over a partial region (a metallic luster portion) to be remained among the metallic layer; and (3) a process to remove the partial region of the metallic layer not to be covered with the mask layer after the etching is performed using acid or alkali is known (for example, see Paragraph [0021] of Patent Literature 1).

Further, as the method via the water washing treatment process, mainly, a method containing (1) a process to form a solvent-soluble resin layer (a water-soluble resin layer) in a portion not requiring a metallic layer out of the underlayer; (2) a process to form a metallic layer over the entire surface of the underlayer partially coated with the solvent-soluble resin layer so as to cover the solvent-soluble resin layer, as well; and (3) a process to remove any unnecessary metallic layer along with the solvent-soluble resin layer by washing with water or a solution, which is a solvent, is known (for example, see Paragraph [0021] of Patent Literature 1).

In the case of the method via the water washing treatment process, it is difficult to completely remove a water-soluble resin layer, and in the decorative material formed while a residue of the water-soluble resin layer that has been swelled due to containing moisture remains, corrosion of the metallic layer progresses due to the moisture or pinholes may occur due to the swelling. In the meantime, since no water-soluble resin layer is used in the case of the method via the etching process, it is hard for corrosion of the metallic layer and pinholes to progress. Consequently, in this viewpoint, it can be said that the method via the etching process is a superior forming method to the method via the water washing treatment process.

[Patent Literature 1] Japanese Patent Application Laid-Open No. H8-324196
[Patent Literature 2] Japanese Patent Application Laid-Open No. S60-168689

DISCLOSURE OF THE INVENTION

Problem to be Solved by the Invention

However, in the case of partially forming a metallic layer, such as the radio wave permeable metallic layer, using the method via the etching, the metallic layer to be removed (a non-metallic luster portion) may not be sufficiently removed and a portion may remain, and there is still room for improvement. Further, when a decorative material where the metallic layer in the non-metallic luster portion is not sufficiently removed is used for decoration of a molded body, the molded body cannot be sufficiently decorated with a desired drawing pattern(s) (carved decorative patterns), and there is still room for improvement.

The present invention has been accomplished by taking the problems in the prior art into consideration, and the objective is to provide a decorative material that can easily and sufficiently remove the metallic layer in the non-metallic luster portion, and that can easily and sufficiently decorate a molded body with a desired drawing pattern(s), even when the radio wave permeable metallic layer, which is a metallic layer, is partially formed using the method via etching.

Further, the objective of the present invention is to provide a decorative material that can easily and sufficiently remove a metallic layer in a non-metallic luster portion, and that can easily and sufficiently decorate a molded body with a desired drawing pattern(s) without requiring transfer even when a radio wave permeable metallic layer, which is a metallic layer, is partially formed using the method via etching.

In addition, the objective of the present invention is to provide a method for manufacturing a decorative material that can where a metallic layer of a non-metallic luster portion can be easily and sufficiently removed, and where the decorative material of the present invention can be easily and sufficiently obtained, even when a radio wave permeable metallic layer, which is a metallic layer, is partially formed using the method via the etching processing.

Further, the objective of the present invention is to provide a molded article that is equipped with the decorative material of the present invention, and that is decorated with a desired drawing pattern(s).

Means for Solving the Problem

As a result of devoting themselves into research so as to accomplish the objectives, the inventors discovered that adoption of the configuration where a metallic oxide layer made from aluminum oxide is arranged as a layer to be a base of a radio wave permeable metallic layer, which is a metallic layer, is extremely effective for accomplishing the objectives, and they accomplished the present invention.

In other words, the present invention provides a decorative material, having:

a support substrate having a first principal surface and a second principal surface that face toward each other;

a metallic oxide layer made from aluminum oxide arranged on the first principal surface of the support substrate;

a radio wave permeable metallic layer that is arranged on the metallic oxide layer, and that contains at least one type to be selected from a group consisting of Sn and In as a structural component;

a mask layer that is arranged on the radio wave permeable metallic layer, and that contains a synthetic resin; and an adhesive layer that is arranged on the mask layer, and that contains a synthetic resin; and having a configuration where the mask layer, the radio wave permeable metallic layer and the metallic oxide layer are laminated with roughly the same pattern viewing from a roughly-normal direction of the principal surface of the support substrate.

As described above, the decorative material of the present invention has a configuration where a metallic oxide layer made from aluminum oxide is arranged as a layer to be a base of the radio wave permeable metallic layer. With this configuration, the inventors discovered as a result of devoting research that the radio wave permeable metallic layer in the non-metallic luster portion is easily and sufficiently removed along with the metallic oxide layer when the radio wave permeable metallic layer is partially formed using the method via etching.

Therefore, according to the decorative material of the present invention, the radio wave permeable metallic layer in the non-metallic luster portion can be easily and sufficiently removed and a molded body can be easily and sufficiently decorated with a desired drawing pattern(s) by adopting the configuration where a metallic oxide layer made from aluminum oxide as a layer to be a base of the radio wave permeable metallic layer is arranged, even when the radio wave permeable metallic layer is partially formed using the method via etching.

Further, in the decorative material of the present invention, a difference in total beam transmittance between a portion having metallic luster (a portion of the radio wave permeable metallic layer) and a portion without metallic luster (a portion where the radio wave permeable metallic layer is removed) becomes greater and contrast becomes more distinct by adopting the configuration where the radio wave permeable metallic layer is arranged on the metallic oxide layer, and characters and/or drawing patterns tend to be clearer (for example, see evaluation test results of embodiment and comparative example to be described later).

In addition, in the decorative material of the present invention, noncrystalline aluminum oxide can be contained in the metallic oxide layer as aluminum oxide. With this, the metallic oxide layer can be easily formed using a normal thin film fabrication method, such as a vacuum vapor deposition method. In addition, from the viewpoint of easy manufacturing, in the decorative material of the present invention, the metallic oxide layer may be made all from noncrystalline aluminum oxide.

Further, the decorative material of the present invention can have a configuration further having a stripping layer containing a synthetic resin to be peelable from the support substrate, the stripping layer being arranged between a support substrate and the metallic oxide layer. With this configuration, on the occasion of arranging and using the decorative material on the surface of the molded body with the adhesive layer, it is designed such that the support substrate can be easily peeled off.

Furthermore, the decorative material of the present invention can adopt a configuration where no stripping layer is included and the support substrate will not be peeled off. In this case, on the occasion of securing the decorative material to a molded body and of manufacturing a molded article, because the support substrate of the decorative material is arranged on the surface of the molded article, it is preferable to configure such that the support substrate at least has a certain level of visible light permeability so as to make a drawing layer to be a base (and a radio wave permeable metallic layer) viewable.

In addition, the present invention provides a method for manufacturing a decorative material, having:

a first process to form a metallic oxide layer made from aluminum oxide on a first principal surface of a support substrate having the first principal surface and a second principal surface that face toward each other;

a second process to form a radio wave permeable metallic layer containing at least one type to be selected from a group consisting of Sn and In as a component on the metallic oxide layer;

a third process to form a mask layer containing a synthetic resin on a portion of the radio wave permeable metallic layer;

a fourth process to apply etching to a portion where no mask layer is formed, and to form a pattern of the radio wave permeable metallic layer and that of the metallic oxide layer to be roughly the same as that of the mask layer, viewing from a roughly-normal direction of the principal surface of the support substrate; and a fifth process to form an adhesive layer containing a synthetic resin on the mask layer.

As described above, the method for manufacturing a decorative material relating to the present invention has the first process to form a metallic oxide layer made from aluminum oxide on the first principal surface of the support substrate before the second process to form the radio wave permeable metallic layer. In other words, in the manufacturing process, the metallic oxide layer made from aluminum oxide is arranged as a layer to be a base of the radio wave permeable metallic layer.

Consequently, according to the method for manufacturing a decorative material relating to the present invention, even when a radio wave permeable metallic layer is partially formed using a method via etching, a metallic layer in a nonmetallic luster portion can be easily and sufficiently removed, and the decorative material of the present invention where a molded body can be easily and sufficiently decorated with a desired patter(s) can be easily and certainly obtained.

Further, according to the method for manufacturing the decorative method relating to the present invention, the inventors of the present invention discovered that a metallic oxide layer and a radio wave permeable metallic layer in a portion where no mask layer is formed can be easily and sufficiently removed by forming the radio wave permeable metallic layer on the metallic oxide layer even if etching is performed using a weaker acid or base than the conventional one in the fourth process.

Thus, in the method for manufacturing the decorative material relating to the present invention, since it is possible to perform etching using a weaker acid or base than the conventional one, when a configuration having a support substrate containing a synthetic resin as a structural component is adopted or when a configuration where a layer containing a synthetic resin as a structural component (such as a pattern layer to be described later or first anchor layer) is arranged between the support substrate and the metallic oxide layer is adopted, any damage to the support substrate and/or the layer containing a synthetic resin as a component can be easily and sufficiently prevented.

In addition, in the method for manufacturing the decorative material relating to the present invention, in the first process, a metallic oxide layer made from aluminum oxide may be formed using a physical vapor deposition method or a chemical vapor deposition method. With this metallic oxide layer, it becomes possible to easily and certainly form a metallic oxide layer using a known thin film fabrication technology.

In addition, in the method for manufacturing a decorative material relating to the present invention, it is preferable to include a stripping layer forming process to form a stripping layer containing a synthetic resin on a first principal plane of the support substrate to be peelable from a support substrate before the first process, and to form a metallic oxide layer on the stripping layer formed during the stripping layer forming process in the first process. With this configuration, it becomes possible to more easily and certainly obtain the decorative material that can easily peel off from the support substrate on the occasion of arranging and using a decorative material on the surface of the molded body with the adhesive layer.

Furthermore, the method for manufacturing a decorative material relating to the present invention includes a case to manufacture a decorative layer with a configuration where no stripping layer is formed and no support substrate is peeled off, as well. In this case, since the support substrate of the decorative material becomes arranged on the surface of the molded body on the occasion of securing the decorative material to the molded body and manufacturing a molded object, it is preferable to use the one with a configuration where the support substrate has at least a certain degree of visible-light permeability so as to see a pattern layer (and a radio wave permeable metallic layer) to be a base.

Further, the present invention provides a molded article having a molded body and a decorative material to be arranged on the surface of the molded body, wherein the decorative material is the decorative material of the present invention (decorative material according to claim 1 or 2) and the decorative material is secured to the molded body at the side of an adhesive layer.

Since the molded article of the present invention is equipped with the decorative material of the present invention, the molded article is easily and certainly decorated with a desired pattern(s). Furthermore, this molded article also includes a molded article that does not have a stripping layer, and where a decorative material with a configuration not to peel off the support substrate is secured to the molded body. As described above, in this case, since the support substrate of the decorative material is arranged on the surface of the molded article, it is preferable to configure [the molded article] so as to have at least a certain level of visible-light permeability in order to view a pattern layer (and a radio wave permeability metallic layer) to be a base.

In addition, the present invention provides a molded article having a molded body and a decorative material to be arranged on the surface of the molded body, wherein the decorative material is the decorative material (the decorative material according to claim 3) of the present invention, and, the decorative material is secured to the molded body at the side of the adhesive layer, and a support substrate of the decorative material is peeled off.

The molded article of the present invention is decorated with the decorative material (the decorative material according to claim 3) with the configuration having a stripping layer described above. After this decorative material is secured on the surface of the molded body, the support substrate can be easily peeled off. Even in this case, since the molded article of the present invention to be obtained is equipped with the decorative material of the present invention, the decoration with a desired pattern is easily and certainly applied.

Effect of the Invention

According to the present invention, a decorative material where even when a radio wave permeable metallic layer is partially formed using the method via etching by adopting the configuration where a metallic oxide layer made from aluminum oxide is arranged as a layer to be a base of the radio wave permeability metallic layer, the radio wave permeable metallic layer in a non-metallic luster portion can be easily and sufficiently removed, and the molded body can be easily and sufficiently decorated with a desired pattern(s) can be provided.

Further, according to the present invention, a decorative material where even when the radio wave permeable metallic layer is partially formed using the method via etching, the radio wave permeable metallic layer in the non-metallic luster portion can be easily and sufficiently removed, and the molded body can be easily and sufficiently decorated with a desired pattern(s) without requiring any transfer can be provided.

In addition, according to the present invention, a method for manufacturing a decorative material where even when a radio wave permeable metallic layer is partially formed using the method via etching, the radio wave permeable metallic layer in the non-metallic luster portion can be easily and sufficiently removed and the decorative material of the present invention can be easily and certainly obtained can be provided.

Further, the present invention can provide a molded article that is equipped with the decorative material of the present invention, and that is decorated with a desired pattern(s).

BEST MODE FOR CARRYING OUT THE INVENTION

Hereafter, preferred embodiments of the present invention are explained in detail with reference to drawings. Furthermore, in the explanation hereafter, the same or equivalent parts are marked with the same symbols, respectively, and redundant explanations may be omitted, and because the drawings are for conceptually explaining the present invention, and dimensions of each of shown constituent elements and their ratios may be different from the actual ones.

FIRST EMBODIMENT

<<Decorative Material>>

Figure 1:
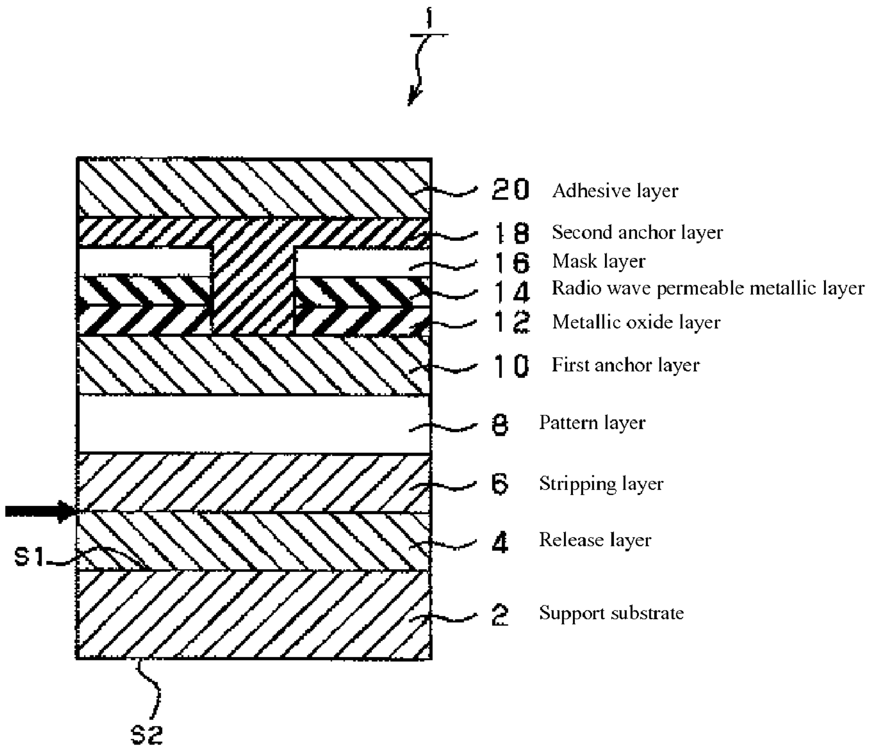
FIG. 1 is a cross-sectional pattern diagram showing a basic configuration of the decorative material of the present invention in the First Embodiment.

FIG. 1 is a cross-sectional pattern diagram showing a basic configuration of the decorative material of the present invention in the First Embodiment. Hereafter, a decorative material 1 shown in FIG. 1 is explained.

The decorative material 1 in the First Embodiment shown in FIG. 1 is mainly configured by having: a support substrate 2 having a first principal surface S1 and a second principal surface S2 that face toward each other roughly in parallel; a metallic oxide layer 12 that is arranged on the first principal surface [S1] of the support substrate 2, and that is made from aluminum oxide; a radio wave permeable metallic layer 14 that is arranged on the metallic oxide layer 12, and that contains at least one type to be selected from a group consisting of Sn and In; a mask layer 16 that is arranged on the radio wave permeable metallic layer 14, and that contains a synthetic resin; and an adhesive layer 20 that is arranged on the mask layer 16, and that contains a synthetic resin.

Then, the decorative material 1 of the First Embodiment shown in FIG. 1 has a configuration where the mask layer 16, the radio wave permeable metallic layer 14 and the metallic oxide layer 12 are laminated by having roughly the same patterns viewing from a roughly-normal direction of the principal surface of the support substrate 2.

In addition, in the case of the decorative material 1 in First Embodiment shown in FIG. 1, this material has a configuration where a plurality of layers (four layers) are further arranged between the support substrate 2 and the metallic oxide layer 12.

Explaining these plurality of layers in order from the layer arranged closer to the support substrate 2, as shown in FIG. 1, the decorative material 1 has a release layer 4 arranged adjacently on the support substrate 2; a stripping layer 6 arranged adjacently on the release layer 4; a pattern layer 8 arranged adjacently on the stripping layer 6; and a first anchor layer 10 arranged adjacently on the pattern layer 8.

Further, in the case of the decorative material 1 of the First Embodiment shown in FIG. 1, the material has a configuration where a second anchor layer 18 is further arranged between the mask layer 16 and the adhesive layer 20.

The plurality of layers composing the decorative layer 1 are explained in detail hereafter. As the support substrate 2, a support substrate of a known decorative material can be used. As a constituent material of the support substrate 2, at least one type of synthetic resin selected from a group consisting of polycarbonate-series resin, polyamide-series resin, polyimide-series resin, polyester-series resin, acrylic resin, olefinic resin, urethane resin and acrylonitrile butadiene styrene resin is preferably exemplified.

As the support substrate 2, a single-layer sheet formed from the synthetic resin mentioned above, a laminated sheet where two or more single-layer sheets are laminated (the material composition of each single-layer sheet may be the same or different as long as the synthetic resin selected from the group), and copolymer sheet using the synthetic resin mentioned above are exemplified.

The thickness of the support substrate 2 is preferably 5 μm to 500 μm. If the thickness of the support substrate 2 is 5 μm or greater, when the decorative material 1 is secured to a molded body 30 (see FIG. 4), a handling ability at the time of arranging the decorative material in a mold can be more sufficiently secured. Further, if the thickness of the support substrate 2 is 500 μm or less, moderate rigidity can be obtained and the handling ability can become more sufficiently secured.

The release layer 4 is a layer to be arranged between the support substrate 2 and the stripping layer 6 in order to enhance a peeling property of the support substrate 2 from the stripping layer 6. The release layer 4 is a layer that is peeled off from the stripping layer 6 along with the support substrate 2 after the decorative material 1 is secured to the molded body 30 (see FIG. 4), and that does not remain in the decorative material 1 secured to the molded body 30.

As a constituent material of the release layer 4, at least one type of synthetic resin selected from a group consisting of amino alkyd-series resin, epoxy-series resin, melamine-series resin, urea-series resin, polyurethane-series resin, polyester-series resin and phenol-series resin is preferably exemplified.

The stripping layer 6 is a layer entirely or partially formed on the release layer 4. The stripping layer 6 is a layer that is peeled off from the release layer 4 and becomes the outermost layer of the decorative material 1 secured to the molded body 30 on the occasion of peeling off the support substrate 2 and the release layer 4 after the decorative material 1 is secured to the molded body 30 (see FIG. 4).

As a constituent material of the stripping layer 6, at least one type of synthetic resin to be selected from a group consisting of acrylic resin, pyroxylin-series resin, polyurethane-series resin, chlorinated rubber resin, vinyl chloride-vinyl copolymer resin, polyamide-series resin, polyester-series resin, epoxy resin, polycarbonate-series resin, olefic resin and acrylonitrile butadiene styrene resin is preferably exemplified.

Further, when hardness is required to the stripping layer 6 (i.e., when the stripping layer 6 is a hard coating layer), as a constituent material of the stripping layer 6, at least one type of synthetic resin to be selected from a group consisting of photocurable resin, such as ultraviolet curable resin, radiation curable resin, such as electron-beam curable resin, and thermosetting resin is preferably exemplified.

The thickness of the stripping layer 6 is preferably 0.5 μm to 50 μm. If the thickness of the stripping layer 6 is 0.5 μm or greater, sufficient adhesiveness can be more certainly obtained. If the thickness of the stripping layer 6 is 50 μm or lower, it is preferable because it is easily dried after the decorative material 1 is secured to the molded body 30 (see FIG. 4). Furthermore, the stripping layer 6 may be a colored one or uncolored one.

The pattern layer 8 is a layer that is formed on the stripping layer 6 for expressing characters and/or a pattern(s). The pattern layer 8 is formed using coloring ink containing at least a coloring agent and a synthetic resin to be a binder as constituent materials in order to express characters and patterns.

As the synthetic resin to be a binder of the pattern layer 8, at least one type of synthetic resin to be selected from a group consisting of polyvinyl-series resin, polyamide-series resin, polyester-series resin, acrylic-series resin, polyurethane-series resin, polyvinyl acetal-series resin, polyester urethane-series resin, cellulose ester-series resin, alkyd resin, vinyl chloride-vinyl acetate copolymer resin, thermoplastic urethane-series resin, methacryl-series resin, acrylic acid ester-series resin, chlorinated rubber-series resin, polyethylene chloride-series resin and chlorinated polypropylene-series resin is preferable.

As the coloring agent contained in the coloring ink of the pattern layer 8, pigments or dye is exemplified. As the pigments, (1) plant pigments, such as indigo, alizarin, carthamin, anthocyanin, flavonoid or shikonin; (2) food color, such as azo, xanthene or triphenylmethane; (3) natural inorganic pigments, such as ocher or green earth; and (4) calcium carbonate, titanium oxide, aluminum lake, madder lake and cochineal lake are preferably exemplified.

The thickness of the pattern layer 8 is preferably 0.5 μm to 50 μm. If the thickness of the pattern layer 8 is 0.5 μm or less, a sufficient design property becomes more easily obtained. If the thickness of the pattern layer 8 is 50 μm or less, it is preferable because this is easily dried after the decorative material 1 is secured to the molded body 30 (see FIG. 4).

The first anchor layer 10 is a layer arranged between the pattern layer 8 and the metallic oxide layer 12 in order to improve the adhesiveness with the pattern layer 8 and with the metallic oxide layer 12.

As a constituent material of the first anchor layer 10, at least one type of synthetic resin to be selected from a group consisting of two-pack curable urethane resin, thermoset urethane resin, melamine-series resin, cellulose ester-series resin, chlorine-containing rubber-series resin, acrylic-series resin, epoxy-series resin and vinyl-series copolymer resin is preferably exemplified. The thickness of the first anchor layer 10 can be appropriately selected within the scope not impairing the effect of the present invention.

The metallic oxide layer 12 is a layer that is made from aluminum oxide, and that is arranged on the first anchor layer 10. This metallic oxide layer 12 is arranged so as to laminate the metallic oxide layer 12, the mask layer 16 and the radio wave permeable metallic layer 14 while having the same pattern viewing from a roughly-normal direction of the principal surface of the support substrate 2. Since this metallic oxide layer 12 is insulating, even if this layer exists, it does not affect the radio wave permeability.

This metallic oxide layer 12 may contain noncrystalline aluminum oxide as aluminum oxide. With this composition, the metallic oxide layer can be easily formed using a normal thin film fabrication, such as a vacuum deposition method. In addition, from a viewpoint of easy manufacturing, the metallic oxide layer may be all made from noncrystalline aluminum oxide.

The thickness of the metallic oxide layer 12 is preferably 50 nm to 100 nm. If the thickness of the metallic oxide layer 12 is 5 nm or greater, the metallic oxide layer 12 can be more easily and more certainly formed over the entire surface of the first anchor layer 10. If the thickness of the metallic oxide layer 12 is 100 nm or less, generation of cracks is prevented and sufficient workability and permeability of the decorative material 1 can be more easily and certainly obtained.

The radio wave permeable metallic layer 14 is a discontinuous layer arranged on the metallic oxide layer 12 in order to add metallic luster to characters and/or a pattern(s) on the pattern layer 8, and is for exhibiting the radio wave permeability because of the discontinuity. However, in FIG. 1 and FIG. 2 to be described later, the radio wave permeable metallic layer 14 is expressed as a continuous layer as a matter of convenience.

The radio wave permeable metallic layer 14 should contain at least one type to be selected from a group consisting of Sn and In as a structural component. A constituent material to be contained in the radio wave permeable metallic layer 14 other than Sn and In and its content should be appropriately selected by taking a viewpoint to obtain desired metallic luster color and adhesiveness with the metallic oxide layer into consideration, and they are not particularly limited. For example, at least one type of metal to be selected from a group aluminum, nickel, gold, platinum, chrome, iron, copper, tin, indium, silver, titanium, lead and zinc; an alloy containing at least one type of metal selected from the group above; and a compound containing at least one type of metal selected from the group can be contained as a structural component other than Sn and In, may be contained as a structural component other than Sn or In.

This radio wave permeable metallic layer 14 is arranged to laminate the radio wave permeable metallic layer 14, the mask layer 16 and the metallic oxide layer 12 by having roughly the same pattern.

The thickness of the radio wave permeable metallic layer 14 is preferably 10 nm-80 nm. If the thickness of the radio wave permeable metallic layer 14 is 10 nm or greater, sufficient sense of metallic luster can be easily obtained. If the thickness of the radio wave permeable metallic layer 14 is 80 nm or less, the radio wave permeability of the radio wave permeable metallic layer 14 can be more easily and more certainly obtained.

As a discontinuous structure of the radio wave permeable metallic layer 14, for example, an island structure is acceptable. The island structure is a structure with thin film thickness in the initial stage of film formation using a vacuum deposition method, a sputtering method, an ion plating method or an electroplating, and is a structure that adheres in a divided small region and indicates an aspect like island-studded sea. The reason why it shows such aspect is because of surface energy of the thin film substance.

The width of the island portion in the island structure is preferably 1 nm to 2,000 nm. If the width of the island portion is 1 nm or greater, beautiful metallic luster is obtained. If the width of the island portion is 2,000 nm or less, an area of the island portion will not become too large and the radio wave permeability can be certainly demonstrated; concurrently, the island portions will not come too closer to each other, but discharge attributed to a tunnel current of charged electric charge hardly occurs and the island portions hardly cause combustion or thermal shrinkage. Consequently, the radio wave permeability can be more certainly demonstrated.

The gap between the island portions in the island structure can have intervals, for example, at 1 nm to 800 nm. If the interval is 1 nm or greater, the island portions will not come too close to each other and discharge attributed to a tunnel current of charged electric charge hardly occurs and the island portions hardly cause combustion or thermal shrinkage. Consequently, the radio wave permeability can be more certainly demonstrated. If the interval is 800 nm or less, an area of the radio wave permeable metallic layer 14 is secured and beautiful metallic luster can be obtained. In order to have a design expression with beautiful metallic luster and to secure the radio wave permeability, a proportion of the island portions to the entire area is preferably 80% or greater, and a ratio of the gap between the island portions is preferably 20% or less.

The mask layer 16 is a layer to be formed over a portion, which is not removed by etching, but where metallic luster is trying to be obtained, out of the radio wave permeable metallic layer 14, and when the radio wave permeable metallic layer 14 has an island structure, the mask layer 16 has a structure to be fitted into the gap between the island portions.

A constituent material of the mask layer 16 is not particularly limited as long as the material is not dissolved by etching, and any constituent materials that are adopted for a known mask layer within the scope not to be dissolved by etching is usable. The thickness of the mask layer 16 is particularly limited as long as the thickness is not dissolved by etching and is sufficient adhesiveness that can be secured in between the second anchor layer 18, as well.

Further, the mask layer 16 is arranged such that the mask 16, the radio wave permeable metallic layer 14 and the metallic oxide layer 12 have roughly the same pattern viewing from a roughly-normal direction of the principal surface of the support substrate 2.

The second anchor layer 18 is a layer arranged between the mask layer 16 and the adhesive layer 20 in order to improve the adhesiveness with the mask layer 16 and with the adhesive layer 20, and has a configuration to fit into a portion that is removed by etching out of the metallic oxide layer 12 and the radio wave permeable metallic layer 14, and to adhere to the first anchor layer 10 in this portion.

The second anchor layer 18 is arranged to cover a portion where the radio wave permeable metallic layer 14 and the metallic oxide layer 12, which is obtained after etching in the fourth process described later, are removed and the surface of the first anchor layer 10 is exposed to the outside, and another portion of a layered product laminated by having roughly the same pattern (a layered product with the mask layer 16, the radio wave permeable metallic layer 14 and the metallic oxide layer 12).

As the constituent material of the second anchor layer 18, at least one type of synthetic resin to be selected from a group consisting of two-pack curable urethane resin, thermosetting urethane resin, melamine-series resin, cellulose ester-series resin, chlorine-containing rubber resin, chlorine-containing vinyl resin, acrylic resin, epoxy resin and vinyl-series copolymer resin is preferably exemplified. The thickness of the second anchor layer 18 should be appropriately selected within a scope not impairing the effect of the present invention.

The adhesive layer 20 is a layer to be arranged on the second anchor layer 18. The adhesive layer 20 is a layer to be adhered onto the surface of the molded body 30 when the decorative material 1 is secured to the molded body 30 (see FIG. 4), and is a layer to be arranged innermost in the decorative material 1 after being secured on the molded body 30.

The adhesive layer 20 is formed in a portion, which is desired to be adhered onto the molded body 30 out of the surface (principal surface) of the second anchor layer 18, in the decorative material 1. In other words, when the entire surface of the second anchor layer 18 is desired to be adhered onto the molded body 30, the adhesive layer 20 is formed over the entire surface of the second anchor layer 18. Further, when a portion out of the surface of the second anchor layer 18 is desired to be adhered onto the molded body 30, the adhesive layer 20 is formed on a portion out of the second anchor layer 18.

A constituent material of the adhesive layer 20 is not particularly limited as long as sufficient adhesiveness to the molded body 30 can be obtained. When the adhesive layer 20 is thermally compressed onto the molded body 30, as a constituent material of the adhesive layer 20, a synthetic resin having thermosensitivity and pressure sensitivity should be appropriately selected.

For example, when a constituent material of the surface portion of the molded body 30 is polyacrylic resin, as a constituent material of the adhesive layer 20, it is preferable to use polyacrylic resin. Further, for example, when a constituent material of the surface portion of the molded body 30 is polyphenylene oxide copolymer, polystyrene-series copolymer resin, polycarbonate-series resin, styrene-series resin or a polystyrene-series blend resin, as a constituent material of the adhesive layer 20, polyacrylic resin, polystyrene-series resin or polyamide-series resin, which has affinity with these resins, should be appropriately selected and adopted.

In addition, for example, when the constituent material on the surface of the molded body 30 is polypropylene resin, as a constituent material of the adhesive layer 20, chlorinated polyolefin resin, chlorinated ethylene-vinyl acetate copolymer resin, cyclized rubber and coumarone-indene resin are usable.

The thickness of the adhesive layer 20 is preferably 0.5 μm-50 μm. If the thickness of the adhesive layer 20 is 0.5 μm or greater, sufficient adhesiveness can become more easily and certainly obtained. If the thickness of the adhesive layer 20 is 50 μm or less, it is preferable because it is dried out after the decorative material 1 is secured to the molded body 30.

As explained above, since the decorative material 1 in the First Embodiment has the configuration where the radio wave permeable metallic layer 14 is placed on the metallic oxide layer 12, even when the radio wave permeable metallic layer 14 is partially formed using the method via etching, the radio wave permeable metallic layer in a nonmetallic luster portion can be easily and sufficiently removed. Then, a molded body can be easily and sufficiently decorated with a desired pattern(s) by using the decorative material 1 in the First Embodiment.

<<Method for Manufacturing Decorative Material>>

Next, the method for manufacturing a decorative material relating to the present invention in the First Embodiment (one preferred embodiment of a method for manufacturing the decorative material 1 in the First Embodiment) is explained with reference to FIG. 2 and FIG. 3.

Figure 2:
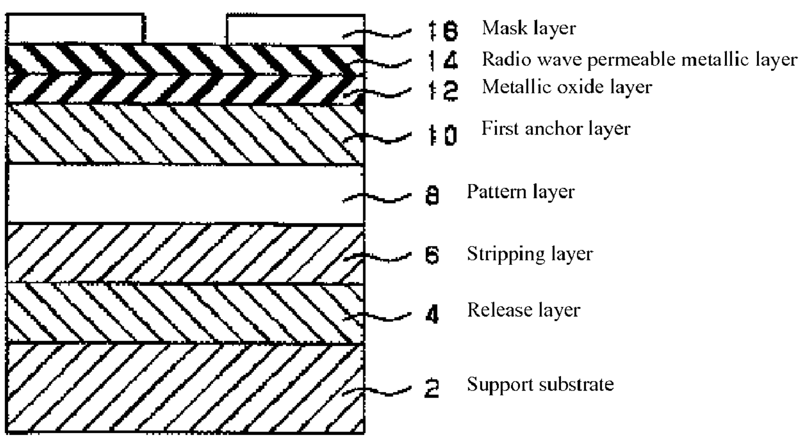
FIG. 2 is an explanatory diagram for showing manufacturing processes up to the third process of the method for manufacturing a decorative material of the present invention in the First Embodiment (manufacturing processes up to the third process when the decorative material in the First Embodiment shown in FIG. 1 is manufactured).

FIG. 2 is an explanatory diagram for showing manufacturing processes up to the third process of the method for manufacturing a decorative material of the present invention (manufacturing processes up to the third process when the decorative material in the First Embodiment shown in FIG. 1 is manufactured). Further, FIG. 3 is an explanatory diagram for showing manufacturing processes after the fourth process of the method for manufacturing a decorative material of the present invention in the First Embodiment (manufacturing processes after the fourth process when the decorative material in the First Embodiment shown in FIG. 1 is manufactured).

Figure 3:
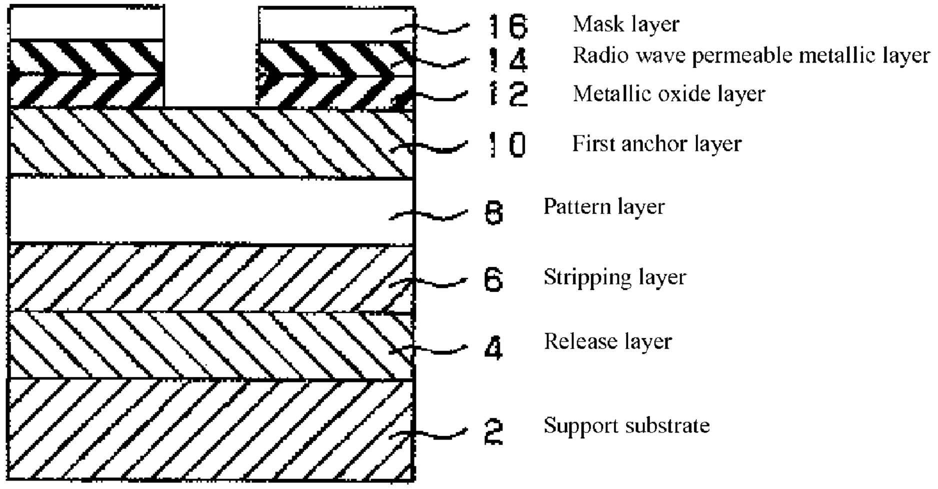
FIG. 3 is an explanatory diagram for showing manufacturing processes after the fourth process of the method for manufacturing a decorative material of the present invention in the First Embodiment (manufacturing processes after the fourth process when the decorative material in the First Embodiment shown in FIG. 1 is manufactured).

As shown in FIG. 2 and FIG. 3, the method for manufacturing a decorative material relating to the present invention in the First Embodiment mainly has a first process to form the metallic oxide layer 12 on the first principal surface Si of the support substrate; a second process to form the radio wave permeable metallic layer 14 on the metallic oxide layer 12; a third process to the mask layer 16 on a portion of the radio wave permeable metallic layer 14; a fourth process to apply etching to a portion where the mask layer 16 is not formed, and to form a pattern of the radio wave permeable metallic layer 14 and that of the metallic oxide layer 12 roughly the same as that of the mask layer 16 viewing from roughly a roughly-normal direction of the principal surface of the support substrate 2; and a fifth layer to form the adhesive layer 20 on the mask layer 16.

In addition, the First Embodiment of the method for manufacturing a decorative material relating to the present invention has a stripping layer forming process for forming the stripping layer 6 including a synthetic resin to be peelable off from the support substrate on the first principal surface S1 of the support substrate 2 before the first process, and in the first process, the metallic oxide layer 12 is formed on the stripping layer 6 formed in the stripping layer forming process. Hereafter, each manufacturing process is more specifically explained.

<Stripping layer forming process>

As shown in FIG. 2 and FIG. 3, in the stripping layer forming process in the method for manufacturing a decorative material in the First Embodiment, after the release layer 4 is formed on the support substrate 2, the stripping layer 6 is formed (the release layer 4 and the stripping layer 6 are sequentially formed).

As the method for forming the release layer 4 on the support substrate 2, a known thin film fabrication technology can be adopted within a scope to sufficiently secure the adhesiveness between the support substrate 2 and the release layer 4. For example, a coating method, such as a gravure coating method, a roll coating method, a comma coating method or lip coating method, and a printing method, such as gravure printing method or a screen printing method, can be adopted. Further, on the occasion of forming the release layer 4, a corona treatment or a glow plasma treatment can be applied onto the surface of the support substrate 2.

As a method to form the stripping layer 6 on the release layer 4, a known thin film fabrication technology can be adopted within a scope to sufficiently secure the peelability of the stripping layer 6 with regard to the release layer 4. For example, a coating method, such as a gravure coating method, a roll coating method or a comma coating, and a printing method, such as gravure printing method or a screen printing method, can be adopted.

<Pattern layer forming process>

As shown in FIG. 2 and FIG. 3, in the pattern layer forming process in the method for manufacturing a decorative material in the First Embodiment, after a pattern layer 8 is formed on the stripping layer 6, the first anchor layer 10 is formed (the pattern layer 8 and the first anchor layer 10 are sequentially formed).

As the method for forming the pattern layer 8 on the stripping layer 6, a known thin film fabrication technology can be adopted within a scope to sufficiently secure the adhesiveness between the stripping layer 6 and the pattern layer 8. For example, a normal printing method, such as an offset printing method, a gravure printing method, a screen printing method or a flexographic printing method, can be adopted.

In particular, in order to perform polychrome printing or gradation expression; an offset printing method and a gravure printing method are suitable. Further, in the case of monochrome, a coating method, such as a gravure coating method, a roll coating method or a comma coating method, can be adopted. The pattern layer 8 may be entirely formed over the stripping layer 6 or the pattern layer 8 may be partially formed on the stripping layer 6, according to a pattern to be expressed.

As a method to form the first anchor layer 10 on the pattern layer 8, a known thin film fabrication technology can be adopted within a scope to sufficiently secure the adhesiveness between the pattern layer 8 and the first anchor layer 10. For example, a coating method, such as a gravure coating method, a roll coating method or a comma coating method, and a printing method, such as a gravure printing method or a screen printing method, can be adopted.

<First Process>

As shown in FIG. 2 and FIG. 3, in the first process of the method for manufacturing a decorative material in the First Embodiment, the metallic oxide layer 12 is formed on the first anchor layer 10.

As a forming method for the metallic oxide layer 12, a known thin film fabrication technology can be adopted within the scope to sufficiently secure the adhesiveness between the first anchor layer 10 and the metallic oxide layer 12. For example, a physical vapor deposition method and a chemical vapor deposition method can be adopted.

<Second Process>

As shown in FIG. 2 and FIG. 3, in the second process of the method for manufacturing a decorative material in the First Embodiment, the radio wave permeable metallic layer 14 is formed on the metallic oxide layer 12.

As the method to form the radio wave permeable metallic layer 14 on the metallic oxide layer 12, a known thin film fabrication technology to sufficiently secure the adhesiveness between the metallic oxide layer 12 and the radio wave permeable metallic layer 14 can be adopted. For example, a vacuum deposition method, a sputtering method, an ion plating method and electroplating can be adopted.

<Third Process>

As shown in FIG. 2, in the third process of a method for manufacturing a decorative material in the First Embodiment, the mask layer 16 including a synthetic resin is formed on a portion of the radio wave permeable metallic layer 14 (a portion where the radio wave permeable metallic layer is desired to be remained).

As a method for forming the mask layer 16 on the radio wave permeable metallic layer 14, a known method for forming a mask layer suitable for known etching can be adopted.

<Fourth Process>

As shown in FIG. 3, in the fourth process in the method for manufacturing a decorative material in the First Embodiment, etching is applied to the portion where the mask layer 16 is not formed, and a pattern of the radio wave permeable metallic layer 14 and that of the metallic oxide layer 12 are formed to be roughly the same as that of the mask layer 16 viewing from a roughly-normal direction of the principal surface of the support substrate 2.

As an etching solution to be used for etching, for example, an acidic solution whose pH is 0-2.5 or a basic solution whose pH is 12.5-14 is preferable. Further, the more preferable upper limit of pH of the acidic solution is approximately 2, and the more preferable upper limit of pH of the basic solution is approximately 13. From the viewpoint to more certainly prevent damage to the first anchor layer due to etching, a mildly acidic solution or a mildly basic solution with the ranges of pH is more preferable. In the decorative material 1 of the present embodiment, since the radio wave permeable metallic layer 14 is arranged on the metallic oxide layer 12, the radio wave permeable metallic layer 14 and the metallic oxide layer 12 that are not masked by the mask layer 16 can be sufficiently removed even with the etching using the mildly acidic or mildly basic solution.

As acid to be used for the etching solution, any acid is acceptable as long as the acid is dissolved into water and can develop the acidity within the pH range above. For example, at least one type of acid to be selected from a group consisting of phosphoric acid, nitric acid, hydrochloric acid, sulfuric acid and ferric chloride is preferably exemplified.

As the base to be used for the etching solution, any base is acceptable as long as the base is dissolved into water and can develop the basicity within the pH range above. For example, at least one type of base to be selected from a group consisting of sodium hydroxide and potassium hydroxide is preferably exemplified.

<Fifth Process>

In the fifth process of the method for a decorative material in the First Embodiment, the second anchor layer 18 and the adhesive layer 20 are sequentially formed (see FIG. 1) on the mask layer 16 and the first anchor layer 10 (see FIG. 3), which is exposed to the outside by removing the radio wave permeable metallic layer 14 and the metallic oxide layer 12 due to the etching in the fourth process.

As the method for forming the second anchor layer 18, a known thin film fabrication technology can be adopted within the scope to sufficiently secure the adhesiveness between the first anchor layer 10 and the second anchor layer 18 and that between the mask layer 16 and the second anchor layer 18. For example, a coating method, such as a gravure coating method, a roll coating method or a comma coating method, and a printing method, such as a gravure printing method or a screen printing method, can be adopted.

As a method for forming the adhesive layer 20 on the second anchor layer 18, a known thin film fabrication technology can be adopted within the scope to sufficiently secure the adhesiveness between the second anchor layer 18 and the adhesive layer 20. For example, a coating method, such as a gravure coating method, a roll coating method or a comma coating method, and a printing method, such as a gravure printing method or a screen printing method, can be adopted.

The decorative material 1 in the First Embodiment shown in FIG. 1 can be obtained via the processes.

As explained above, the method for manufacturing the decorative material in the First Embodiment has the first process to form the metallic oxide layer 12 made from aluminum oxide on the first principal surface Si of the support substrate 2 before the second process to form the radio wave permeable metallic layer 14. In other words, in the manufacturing process, the metallic oxide layer 12 made from aluminum oxide is arranged on a layer to be a base of the radio wave permeable metallic layer 14, and the radio wave permeable metallic layer 14 is formed on the metallic oxide layer 12.

Consequently, even when the radio wave permeable metallic layer 14 is partially formed using the method via etching, the radio wave permeable metallic layer 14 in the nonmetallic luster portion can be easily and sufficiently removed, and the decorative material 1 in First Embodiment that can easily and sufficiently decorate the molded body 30 with a desired pattern can be easily and certainly obtained.

Further, according to the method for manufacturing the decorative material in the First Embodiment, due to the formation of the radio wave permeable metallic layer 14 on the metallic oxide layer 12, even if etching is conducted using weaker acid or base than the conventional one in the fourth process, because the radio wave permeable metallic layer 14 has an island structure and the etching solution is penetrated in to the structure in the portion where the mask layer 16 is not formed, the radio wave permeable metallic layer 14 can become easily and sufficiently removes along with the metallic oxide layer 12.

Consequently, since the method for manufacturing the decorative material in the First Embodiment enables the etching using the weaker acid or base than the conventional one, when the configuration having the support substrate 2 containing a synthetic resin as a structural component or when the configuration where layers (the release layer 4, the striping layer 6, the pattern layer 8 and the first anchor layer 10) containing a synthetic resin as a structure component are arranged between the support substrate 2 and the metallic oxide layer 12 is adopted, any damage to the support substrate and/or the layers containing a synthetic resin as a structural component can be easily and sufficiently prevented.

In addition, in the method for manufacturing the decorative material of the First Embodiment, in the first process, the metallic oxide layer made from aluminum oxide is formed using a physical vapor deposition method or a chemical vapor deposition method. With this process, the metallic oxide layer can be formed easily and certainly using a known thin film fabrication technology.

<<Molded Article>>

A basic configuration of the molded article of the present invention in the First Embodiment (the molded article equipped with the decorative material of the present invention in the First Embodiment) is explained with reference to FIG. 4.

Figure 4:
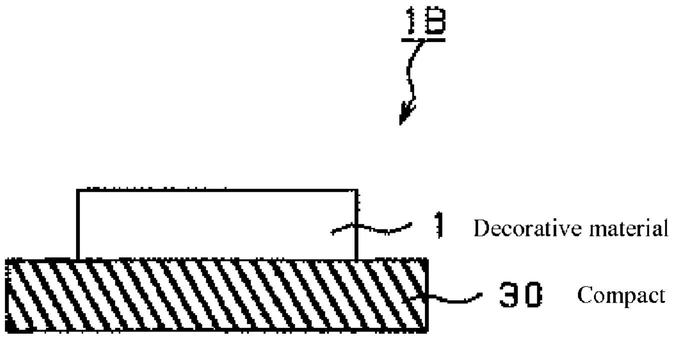
FIG. 4 is a cross-sectional pattern diagram showing a basic configuration of the molded article of the present invention in the First Embodiment (the molded article equipped with the decorative material of the present invention in the First Embodiment).

FIG. 4 is a cross-sectional pattern view showing the basic configuration of the molded article of the present invention in the First Embodiment (the molded article equipped with the decorative material of the present invention in First Embodiment). As shown in FIG. 4, a molded article 1B of the First Embodiment has the molded body 30 and the decorative material 1 arranged on the surface of the molded body 30.

Herein, the decorative material 1 is the decorative material 1 in the First Embodiment shown in FIG. 1 (the decorative material 1 with the configuration having the stripping layer 6), and, the decorative material 1 is secured to the molded body at the side of the adhesive layer. This decorative material 1, as described above, can be easily peeled off from the support substrate 2 after securing onto the surface of the molded body 30. Since the molded article 1B is equipped with the decorative material 1, the decoration with a desired pattern is easily and certainly applied.

The constituent material of the molded body 30 is not particularly limited, and for example, a resin molded body, a rubber molded body, a metal molded body, a wood molded body, a glass molded body, a ceramic molded body or a composite molded body made from these can be exemplified. The molded body 30 can be transparent, translucent or opaque. Further, the molded body 30 can be colored or not colored.

As a synthetic resin to be a constituent material in the case of the resin molded body, for example, a general-purpose resin, such as polystyrene resin, polyolefin resin, ABS resin, AS resin or AN resin, can be exemplified. Further, a general-purpose engineering resin, such as polyphenylene oxide, polystyrene-series resin, polycarbonate-series resin, polyacetal-series resin, acrylic resin, polycarbonate modified polyphenylene ether resin, polybutylene terephthalate resin or ultrahigh molecular weight polyethylene; and a super engineering resin, such as polysulfone resin, polyphenylene sulfilde-series resin, polyphenylene oxide-series resin, polyarylate resin, polyether imide resin, polyimide resin, liquid crystal polyester resin or polyarllyl-series high-temperature resin, can also be used. In addition, a composite resin where a reinforcement material, such as glass fiber or inorganic filler, is added can also be used.

Next, the method for manufacturing the molded article of the present invention shown in FIG. 4 is not particularly limited, and a known method for securing a decorative material to a molded body can be adopted. For example, the methods described in Japanese Patent Application Laid-Open Nos. H8-3244196 and 2008-94038 can be adopted.

SECOND EMBODIMENT

<<Decorative Material>>

Figure 5:
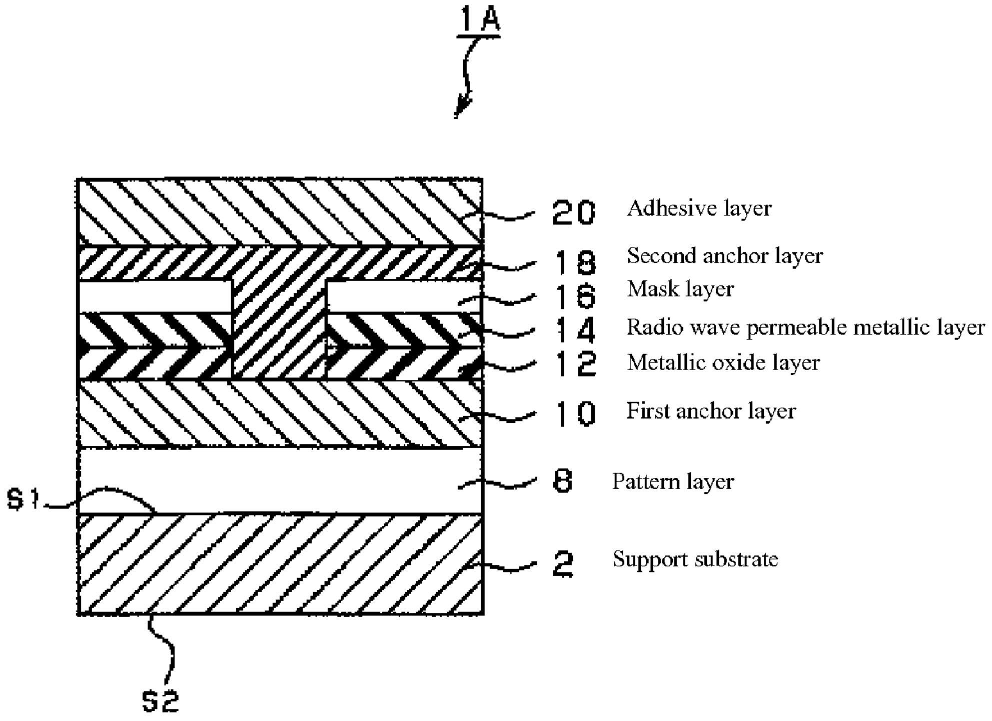
FIG. 5 is a cross-sectional pattern diagram showing a basic configuration of the decorative material of the present invention in the Second Embodiment.

FIG. 5 is a cross-sectional pattern diagram showing a basic configuration of the decorative material of the present invention in the Second Embodiment. Hereafter, a decorative material 1A shown in FIG. 5 is explained. Furthermore, the same constituent elements as the constituent elements explained about the decorative material shown in FIG. 1 are marked with the same symbols, respectively, and any redundant explanations may be omitted.

The decorative material 1A in the Second Embodiment shown in FIG. 5 is also configured, as similar to the decorative material 1 shown in FIG. 1, by mainly having the support substrate 2, which has the first principal surface S1 and the second principal surface S2 that face roughly in parallel toward each other; the metallic oxide layer 12 that is arranged on the first principal surface of the support substrate 2 and is made from aluminum oxide; the radio wave permeable metallic layer 14 containing at least one type to be selected from a group consisting of Sn and In as a structural component; the mask layer 16 that is arranged on the radio wave permeable metallic layer 14 and contains a synthetic resin; and the adhesive layer 20 that is arranged on the mask layer 16 and contains a synthetic resin.

The decorative material 1A in the Second Embodiment shown in FIG. 5, as similar to the decorative material 1 shown in FIG. 1, also has a configuration where the mask layer 16, the radio wave permeable metallic layer 14 and the metallic oxide layer 12 are laminated by having roughly the same pattern viewing from a roughly-normal direction of the principal surface of the support substrate 2.

Further, the decorative material 1A in the Second Embodiment shown in FIG. 5, as similar to the decorative material 1 in the First Embodiment shown in FIG. 1, also has a configuration where the second anchor layer 18 is arranged between the mask layer 16 and the adhesive layer 20.

However, the decorative material 1A of the Second Embodiment shown in FIG. 5 has a configuration that is different from that of the decorative material 1 shown in FIG. 1, in a point mentioned below. In other words, in the case of the decorative material 1A of the Second Embodiment shown in FIG. 5, it has a configuration where a plurality of layers (two layers) are further arranged between the support substrate 2 and the metallic oxide layer 12.

Sequentially explaining a plurality of these layers from a layer arranged closer to the support substrate 2, as shown in FIG. 5, the decorative material 1A has the pattern layer 8 that is adjacently arranged on the support substrate 2 and the first anchor layer 10 that is adjacently arranged on the pattern layer 8. In other words, the decorative material 1A in the Second Embodiment shown in FIG. 5 has a configuration not having the release layer 4 and the stripping layer 6, which are shown in FIG. 1.

Figure 6:
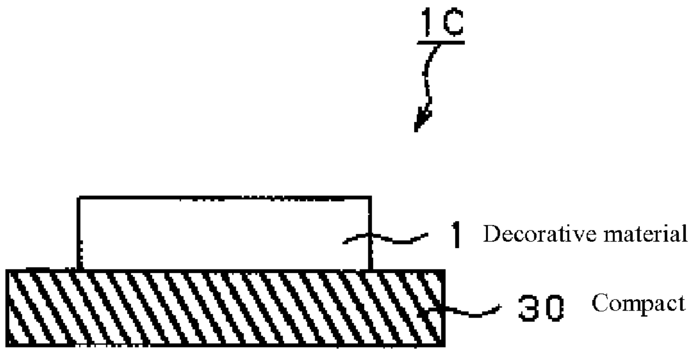
FIG. 6 is a cross-sectional pattern diagram showing a basic configuration of the molded article of the present invention in the Second Embodiment (the molded article equipped with the decorative material of the present invention in the Second Embodiment).

In the decorative material 1A in the Second Embodiment, the configuration where the release layer 4 and the stripping layer 6 are not included, and where the support substrate 2 is peeled off in the case that the decorative material 1A is secured to the molded body 30 a molded article 1C is realized (see FIG. 6).

In this case, on the occasion of securing the decorative material 1A to the molded body 30 and manufacturing the molded article 1C, since the support substrate 2 of the decorative material 1A is arranged on the surface of the molded article, the support substrate 2 is configured to have at least a certain level of visible light permeability so as to view the pattern layer 8 to be a base (and the radio wave permeable metallic layer 14).

As explained above, since the decorative material 1A in the Second Embodiment has the configuration where the radio wave permeable metallic layer 14 is placed on the metallic oxide layer 12, even in the case of partially forming the radio wave permeable metallic layer 14 using the method via etching, the radio wave permeable metallic layer in the nonmetallic luster portion can be easily and sufficiently removed. Then, a molded body can be easily and sufficiently decorated with a desired pattern(s) by using the decorative material 1A in the Second Embodiment.

<<Method for Manufacturing Decorative Material>>

Next, the method for manufacturing the decorative material of the present invention in the Second Embodiment (one preferred embodiment of the method for manufacturing the decorative material 1A in the Second Embodiment) is explained with reference to FIG. 5.

The method for manufacturing the decorative material of the present invention in the Second Embodiment, as shown in FIG. 5, has the similar configuration as that of the method for manufacturing the decorative material of the present invention in the First Embodiment, except for directly arranging the pattern layer 8 on the first principal surface 51 of the support substrate 2.

In other words, in the method for manufacturing the decorative material of the present invention in the Second Embodiment, there is no stripping layer forming process, which was explained in the method for manufacturing the decorative material of the present invention in the First Embodiment, and the pattern layer 8 is directly arranged on the first principal surface 51 of the support substrate 2 in the pattern layer forming process. Consequently, in the method for manufacturing the decorative material in the Second Embodiment, only the pattern layer forming process is explained, but other processes will be omitted.

<Pattern Layer Forming Process>

As shown in FIG. 5, in the pattern layer forming process of the method for manufacturing the decorative material in the Second Embodiment, after the pattern layer 8 is formed on the support substrate 2, the first anchor layer 10 is formed (the pattern layer 8 and the first anchor layer 10 are sequentially formed).

As a method for forming the pattern layer 8 on the support substrate 2, a known thin film fabrication technology can be adopted within the scope to sufficiently secure the adhesiveness between the support substrate 2 and the pattern layer 8. For example, a normal printing method, such as an offset printing method, a gravure printing method, a screen printing method or flexographic printing method, can be adopted.

In particular, in order to conduct multicolor printing or gradation expression, the offset printing method and the gravure printing method are suitable. Further, in the case of monochrome, a coating method, such as a gravure coating method, a roll coating method or a comma coating method, can also be adopted. The pattern layer 8 may be entirely placed over the support substrate 2 or partially placed on the support substrate 2, according to a pattern to be expressed.

As a method for forming the first anchor layer 10 on the pattern layer 8, a known thin film fabrication technology can be adopted within a scope to sufficiently secure the adhesiveness between the pattern layer 8 and the first anchor layer 10. For example, a coating method, such as a gravure coating method, a roll coating method or a comma coating method, or a printing method, such as a gravure printing method or a screen printing method, can be adopted.

<<Molded Article>>

Next, a basic configuration in the Second Embodiment of the molded article of the present invention in (the molded article equipped with the Second Embodiment of the decorative material of the present invention) is explained with reference to FIG. 6.

FIG. 6 is a cross-sectional pattern diagram showing a basic configuration of the molded article of the present invention in the Second Embodiment (the molded article equipped with the decorative material of the present invention in the Second Embodiment).

Herein, the decorative material 1A (the decorative material 1A with the configuration not having a release layer and a stripping layer) in the Second Embodiment shown in FIG. 5, and the decorative material 1A is secured to the molded body 30 at the side of the adhesive layer 20. As described above, after this decorative material 1A is secured onto the surface of the molded body 30, the support substrate 2 is not peeled off. Since the molded article 1C is equipped with the decorative material 1A, decoration with a desired pattern(s) is easily and certainly applied.

Next, a method for manufacturing the molded article of the present invention shown in FIG. 6 is not particularly limited, but a known method for securing a decorative material to a molded body can be adopted. For example, the methods described in Japanese Patent Application Laid-Open Nos. H8-324196 and 2008-94038 can be adopted.

[Modified Form]

Thus, the preferred embodiments of the present invention were explained, but the present invention is not limited to those embodiments. The embodiments herein are some examples of the present invention, and it is possible to variously change designs within scopes of a technical concept and teaching in Scope of Patent Claims; therefore, other embodiments are variously available, and needless to say, they belong to the technical scope of the present invention.

For example, in the decorative material 1 of the First Embodiment shown in FIG. 1, the configuration where the release layer 4 is arranged between the support substrate 2 and the stripping layer 6 was explained, but the decorative material of the present invention is not limited to this configuration. For example, the decorative material of the present invention may have a configuration where the release layer 4 is not included and the stripping layer 6 is adjacently arranged on the support substrate 2.

Further, for example, in the decorative material of the First Embodiment shown in FIG. 1, the configuration where the pattern layer 8 made from one layer is arranged between the stripping layer 6 and the first anchor layer 10 was explained and the decorative material of the present invention can have a configuration where, for example, a pattern layer composed of a plurality of layers is arranged between the stripping layer 6 and the first anchor layer 10. In this case, in order to ensure about the adhesion between layers, respectively, an anchor layer or an adhesive layer can be placed. Further, for example, the decorative material of the present invention can have a configuration where the pattern layer 8 is not included and the first anchor layer 10 is adjacently arranged on the stripping layer 6.

Further, for example, in the decorative material 1 of the First Embodiment shown in FIG. 1, the configuration where the first anchor layer 10 is arranged between the pattern layer 8 and the metallic oxide layer 12 and the second anchor layer 18 is arranged between the mask layer 16 and the adhesive layer 20 was explained, and the decorative material of the present invention can have a configuration where, for example, the first anchor layer 10 is not included and a metallic oxide layer 12 is adjacently arranged on the pattern layer 8, and can have another configuration where the second anchor layer 18 is not included and the adhesive layer 20 is adjacently arranged on the mask layer 16. Further, both the first anchor layer 10 and the second anchor layer 18 do not have to be included.

Further, for example, in the decorative material 1A of the Second Embodiment shown in FIG. 5, the configuration where the pattern layer 8 made of one layer is arranged between the support substrate 2 and the first anchor layer 10 was explained, and the decorative material of the present invention, for example, can have a configuration where a pattern layer made from a plurality of layers is arranged between the support substrate 2 and the first anchor layer 10. In this case, in order to ensure about the adhesion between the layers, respectively, an anchor layer or an adhesive layer can be placed between a plurality of layers composing the pattern layer, respectively.

Further, for example, in the decorative material 1A of the Second Embodiment shown in FIG. 5, the configuration where the pattern layer 8 is arranged between the support substrate 2 and the first anchor layer 10 was explained, but the decorative material of the present invention, for example, in order to ensure about the adhesion between the support substrate 2 and the pattern layer 8, can have a configuration where the anchor layer or an adhesive layer is arranged between the support substrate 2 and the pattern layer 8.

Further, for example, in the decorative material 1A of the Second Embodiment shown in FIG. 5, the configuration where the first anchor layer 10 is arranged between the pattern layer 8 and the metallic oxide layer 12 and the second anchor layer 18 is arranged between the mask layer 16 and the adhesive layer 20 was explained, and the decorative material of the present invention, for example, can have another configuration where no first anchor layer 10 is included and the metallic oxide layer 12 is adjacently arranged on the pattern layer 8, or another construction where no second anchor layer 18 is included and the adhesive layer 20 is adjacently arranged on the mask layer 16. Further, both the first anchor layer 10 and the second anchor layer 18 do not have to be included.

EXAMPLE

Hereafter, an example and a comparative example are exemplified and the decorative material of the present invention is further explained, but the present invention is not limited to these examples at all. Furthermore, in the examples mentioned below, the decorative material of the present invention in the First Embodiment shown in FIG. 1 was implemented.

Example 1

A biaxially-stretched polyethylene terephthalate film with $38\times10^{-3}$ mm (38 μm) of thickness was used as a support substrate, and a mixture of methyl methacrylate resin and vinyl chloride-vinyl acetate copolymer resin was coated over the entire surface of one surface of this support substrate to be $1\times10^{-3}$ mm (1 μm) of thickness using a gravure printing method, and a stripping layer was formed.

A mixture of acrylic polyol resin and isocyanate resin was coated over the upper entire surface of the stripping layer to be $3\times10^{-3}$ mm (3 μm) of thickness using the gravure coating method, and an anchor layer was formed.

A metallic oxide layer made from aluminum oxide with $150\times10^{-8}$ cm (150 angstrom) of thickness was formed over the upper entire surface of the anchor layer using a vacuum deposition method, and next, a radio wave permeable metallic layer made from Sn with $300\times10^{-8}$ cm (300 angstrom) of thickness was formed over the upper entire surface of the metallic oxide layer using the vacuum deposition method.

Vinyl chloride-vinyl acetate copolymer resin was partially coated on the radio wave permeable metallic layer formed as mentioned above to be $300\times10^{-3}$ mm (1 μm) using a gravure coating method, and a mask layer was formed.

A layered product after the formation of the mask layer was immersed into 1 N sodium hydroxide solution under conditions at 20° C. for 60 seconds and etching was applied, and next, the layered product was immersed into purified water under conditions at 20° C. for 30 seconds and rinsed with water, and a pattern of the radio wave permeable metallic layer and that of the metallic oxide layer were formed roughly the same as that of the mask layer.

Vinyl chloride-vinyl acetate copolymer resin was coated over the entire surface at the mask layer side of the layered product where this etching was applied to be $1\times10^{-3}$ mm (1 μm) using a gravure printing method, and an adhesive layer was formed. As described above, the decorative material (transfer material) of the present invention partially having the radio wave permeable metallic layer was obtained.

Comparative Example

Except that the metallic oxide layer was not formed, as similar to Example 1, i.e., except that the radio wave permeable metallic layer made from Sn with $300\times10^{-8}$ cm (300 angstrom) was formed over the entire surface of the anchor layer after the anchor layer was formed, as similar to Example 1, a comparative decorative material (transfer material) according to Comparative Example 1 was obtained.

[Evaluation Test]

(1) Visual Observation

For the layered product after the formation of the mask layer in Example 1 and Comparative Example 1, after etching and water rinsing treatment were applied; in Example 1, a portion where no mask layer was formed became transparent, but in Comparative Example 1, a metallic luster remained in the portion where no mask layer was formed.

(2) Measurement of Transmitted Light

Further, for the layered product after the formation of the mask layer in Example 1 and Comparative Example 1, the total beam transmittance of the portion where no mask layer was formed was measured before and after the etching and water rinsing treatment. For the measurement, NDH-2000 manufactured by Nippon Denshoku Industries Co., Ltd. was used, and conditions based upon JISK7361 (ISO 13468) were used. Results are shown in the table below. Furthermore, the total beam transmittance of the layered product measured after the formation up to the anchor layer was 90.8%.

TABLE 1

| | Before etching treatment and water rinsing treatment | After etching treatment and water rinsing treatment |
|---|---|---|
| Example 1 | 9.0% | 90.7% |
| Comparative Example 1 | 8.1% | 19.4% |

INDUSTRIAL APPLICABILITY

The decorative material obtained with the present invention can be used for decoration (carving with decorative patterns) of a molded body, such as a case of home electric appliances including mobile phones and personal computer, or, automobile plastic parts. Further, the molded article obtained with the present invention can be used as a molded article excelling in beauty and having an expensive-looking appearance.

The invention claimed is:

1. A method for manufacturing a decorative material, comprising:

a first process to form a metallic oxide layer made from aluminum oxide on a first principal surface of a support substrate having the first principal surface and a second principal surface that face toward each other;

a second process to form a radio wave permeable metallic layer containing at least one type to be selected from the group consisting of Sn and In as a structural component on the metallic oxide layer;

a third process to form a mask layer containing a synthetic resin on a portion of the radio wave permeable metallic layer;

a fourth process to apply etching to a portion where no mask layer is formed, and to form a pattern of the radio wave permeable metallic layer and that of the metallic oxide layer to be roughly the same as that of the mask layer, viewing from a roughly-normal direction of the principal surface of the support substrate; and a fifth process to form an adhesive layer containing a synthetic resin on the mask layer.

2. The method for manufacturing a decorative material in accordance with claim 1, wherein in the first process, a metallic oxide layer made from aluminum oxide is formed using a physical vapor deposition method or a chemical vapor deposition method.

3. The method for manufacturing a decorative material in accordance with claim 1 or 2, comprising: a stripping layer forming process to form a stripping layer containing a synthetic resin on a first principal surface of the support substrate to be peelable off from the support substrate before the first process, wherein in the first process, the metallic oxide layer is formed on the stripping layer formed in the stripping layer forming process.

* * * * *